A method and system for estimating the location of an injection point of foreign signals in a network comprises the steps of measuring signal samples at two points along the cable network distribution system, correlating the two signal samples to estimate propagation delay differences between the measurement locations and the source, and calculating the location and magnitude of the ingress. The propagation delay, or time correlation, is proportional to the offset of the injection point from the midpoint between the measurement sites, where the two parameters are related by the velocity of propagation in the cable. The amplitude of the correlation peaks represent the magnitude of the ingress at that location. Sensitivity may be increased by time-averaging the output of the correlation step. Multiple sources and/or ingress and egress sites may be measured simultaneously.

United States Patent
Harrison

(10) Patent No.: US 6,925,399 B2
(45) Date of Patent: Aug. 2, 2005

(54) METHODS AND SYSTEMS FOR THE ESTIMATION OF THE INJECTION POINT OF FOREIGN SIGNALS IN A NETWORK

(75) Inventor: Warner George Harrison, Medfield, MA (US)

(73) Assignees: Verizon Laboratories Inc., Waltham, MA (US); Genuity, Inc., Cambridge, MA (US)

(*) Notice: Subject to any disclaimer, the term of this patent is extended or adjusted under 35 U.S.C. 154(b) by 456 days.

(21) Appl. No.: 09/822,085
(22) Filed: Mar. 30, 2001

(65) Prior Publication Data
US 2002/0143501 A1 Oct. 3, 2002

(51) Int. Cl.[7] .............................................. G01R 31/00
(52) U.S. Cl. ........................................ 702/59; 324/522
(58) Field of Search ............................... 702/57–60, 62, 702/64–67, 69, 71, 74, 76–78, 106, 107, 183, 185, 51; 324/522, 642; 455/132; 359/173; 73/592, 40.5; 342/463

(56) References Cited

U.S. PATENT DOCUMENTS

| | | | | |
|---|---|---|---|---|
| 3,906,213 A | * | 9/1975 | Meriaux et al. | 702/79 |
| 4,169,245 A | * | 9/1979 | Crom et al. | 455/132 |
| 4,604,717 A | * | 8/1986 | Kaplan | 702/79 |
| 4,779,215 A | * | 10/1988 | Moisan et al. | 702/79 |
| 4,823,293 A | * | 4/1989 | Oda | 708/5 |
| 5,205,173 A | * | 4/1993 | Allen | 73/592 |
| 5,531,099 A | * | 7/1996 | Russo | 73/40.5 A |
| 5,600,248 A | * | 2/1997 | Westrom et al. | 324/522 |
| 5,814,998 A | * | 9/1998 | Gruenewald et al. | 324/536 |
| 5,974,862 A | * | 11/1999 | Lander et al. | 73/40.5 A |
| 6,094,168 A | * | 7/2000 | Duffett-Smith et al. | 342/463 |
| 6,453,247 B1 | * | 9/2002 | Hunaidi | 702/51 |
| 6,476,951 B1 | * | 11/2002 | White | 398/141 |
| 6,525,545 B2 | * | 2/2003 | Hill | 324/642 |

OTHER PUBLICATIONS

Simon Haykin, Communication systems 1993, John Wiley & Sons, Inc., 3rd Edition, p. 276.*

* cited by examiner

Primary Examiner—Patrick Assouad
Assistant Examiner—Mohamed Charioui
(74) Attorney, Agent, or Firm—Leondard C. Suchtya, Esq.; Joel Wall, Esq.; Finnegan Henderson et al.

(57) ABSTRACT

24 Claims, 4 Drawing Sheets

METHODS AND SYSTEMS FOR THE ESTIMATION OF THE INJECTION POINT OF FOREIGN SIGNALS IN A NETWORK

BACKGROUND OF THE INVENTION

1. Field of the Invention

The invention relates generally to the field of network services. More particularly, the present invention relates to a technique for locating a point of ingress, or injection point, of a foreign, or unwanted, signal in a network. Further, by locating a point of ingress, or injection point, of a foreign signal in a network, a site of potential egress, or signal leakage, is located.

2. Background of the Art

In the field of network services, there is much concern about both ingress of foreign signals and egress of transmission signals. Egress, or signal leakage, must be monitored and kept to a minimum to avoid interference with atmospheric signals using the same frequencies. Ingress, or interference, involves an outside signal coupled to an actual signal in the network, distorting the actual signal being transmitted. Ingress and egress can represent major costs to network operators and it is necessary to be able to locate and correct the ingress/egress point in the network in order to provide quality network communication.

For example, in networks including Very high-rate Digital Subscriber Lines (VDSL) operating on twisted pair networks, interference may occur when energy from another service, such as, for example, T1 or ADSL or FCC licensed services, appears as in-band energy to the victim line. Interference may also result from distortion caused by non-linearities within a home translating energy from out-of-band signals into the VDSL band. In cable TV networks, impairments in the network such as flaws in cable joints and connections, cracks, and loose cable shields serve as points of ingress and egress.

Locating the point of ingress/egress, however, is not an easy task. Very often, the signals themselves are noise-like in nature, covering many MHz of bandwidth, and thus causing difficulty in identifying the signals. One scheme suggested to assist with signal identification is the use of a distinctive signature. This suggestion, however, poses a significant disadvantage, as only part of the signal strength available in the original signal is provided by the signal bearing the distinctive signature. In addition, data-carrying capacity may be diminished if the signature is in the signaling band.

In the case of cable TV networks, ingress and egress have conventionally been measured using field strength meters tuned to specific channels, as allocated by the FCC, for monitoring. These meters are typically not extremely sensitive or reliable, being limited in their detector bandwidth to several kHz. Many of these meters also do not permit discrimination between different foreign signals and injection points in a network. In order to discriminate, some meter systems modulate the signal in a cable with a tag, which is then demodulated and used to identify the leakage. Furthermore, the use of these systems is often time-consuming. An alternative practice is to measure ingress to a network and then selectively and systematically remove segments of the network until the ingress is eliminated. This procedure necessarily involves undesirable disruption of communication over the network.

It should be understood that any point where ingress occurs is a potential point of egress, and vice versa. Because it is frequently an easier task to identify ingress into a system, the testing for egress may be prompted by monitoring ingress. Locating the source of ingress/egress often involves testing and locating the point of egress of a signal carried by the transmission cable. In locating this point, an ingress point has also been located.

Further, it should be understood that a method and system for estimating a location of an injection point of foreign signals in a network is not limited to use with VDSL or cable TV networks, but is instead applicable to communication networks in general. As noted above, in determining an injection point of foreign signals, it is understood that a potential egress site has also been located.

Accordingly, there is presently a need for a technique to locate the injection point of a foreign signal in a network that is sufficiently sensitive and reliable, yet is not overly time consuming and further, does not cause unnecessary disruption of communication over the network. There is also a need for a technique that has the capability to locate multiple points of ingress. Further, it is also desirable to have a technique that permits monitoring of a network so that impairments can be identified, measured, and tracked before a communication disruption occurs.

SUMMARY OF THE INVENTION

The present invention comprises a method and system for estimating the location of an injection point of foreign signals in a network. Methods and systems in accordance with the present invention estimate the location of an injection point of foreign signals by measuring samples of the signal at two locations in a network, correlating the two samples to estimate propagation delay differences between the measurement locations and the source, and using the result of the correlation to calculate the location and magnitude of the ingress. The propagation delay, or time correlation, is proportional to the offset of the injection point from the midpoint between the measurement sites, wherein the two parameters are related by the velocity of propagation in the cable. The relative amplitude of the correlation peaks represent the relative magnitude of the ingress at that location. Absolute calibration is possible by injecting a signal of known amplitude. Sensitivity can be further enhanced in methods and systems consistent with the present invention by integrating the sample correlation over time.

Methods and systems consistent with the present invention may be used in locating multiple points of ingress, as the resulting correlation in a system with multiple injection points would contain multiple correlation peaks, corresponding to multiple points of ingress.

Methods and systems consistent with the present invention are also capable of monitoring a network for transient impairments and non-critical leakage through placement of several addressable permanent or temporary frequency translators in the network that permit frequent monitoring without incurring excessive manpower.

Methods and systems consistent with the present invention are capable of detecting sites of potential egress, located at the estimated injection point of a foreign signal into a network.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing summary and the following detailed description of the invention are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the Figures.

DETAILED DESCRIPTION

The following description refers to the accompanying drawings. Where appropriate, the same reference numbers in different drawings refer to the same or similar elements.

Figure 1:
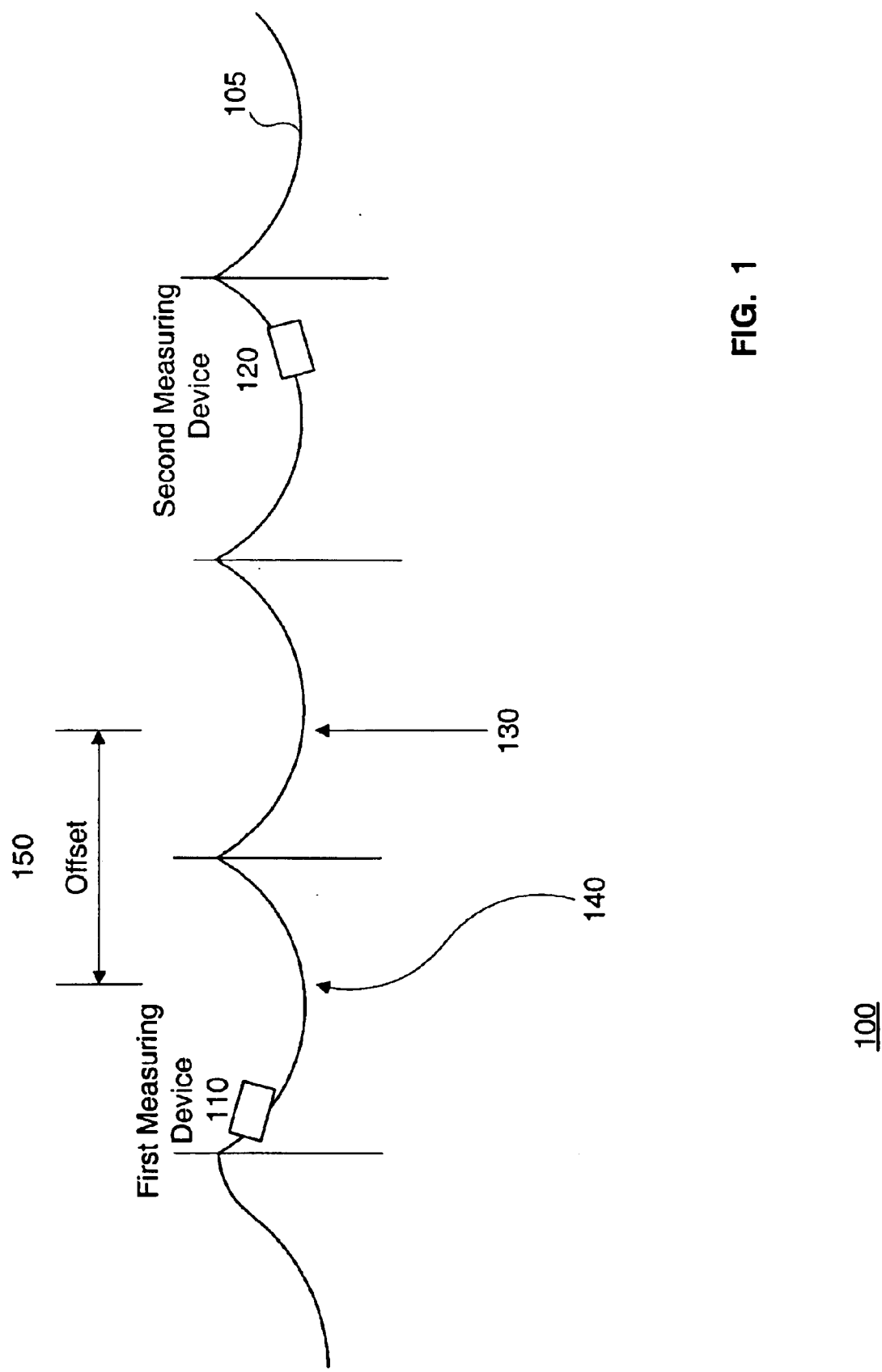
FIG. 1 is a schematic diagram illustrating one exemplary embodiment of the present invention.

Referring first to FIG. 1, the method and system of the present invention may be used for any type of network system 100. A first measuring device 110 measures a first signal sample at one location along a network 105. Preferably, first measuring device 110 is physically attached to the cable. The device 110 should be tightly coupled to the transmission medium to exclude both unintended correlations of ambient signals outside the intended transmission medium and to reduce the undesired noise that might otherwise be injected into the calculations. It is possible to couple to fiber-optic cable with "clamp-on" probes that couple a small amount of energy out of the medium. Alternatively, a permanent coupler could be installed for larger signal coupling. A second measuring device 120 measures a second signal sample at a second location along the network 105. These two signal samples are correlated to obtain a propagation delay, and further obtain a distance (illustrated by the offset 150) that is proportional to the propagation delay as related by the propagation velocity of the signal. The midpoint 130 between the first measuring device 110 and the second measuring device 120 is determined. The estimated location of the injection point of a foreign signal 140 can then be determined by locating the point along the network 105 which is the distance of the offset 150 away from the midpoint 130.

Figure 2:
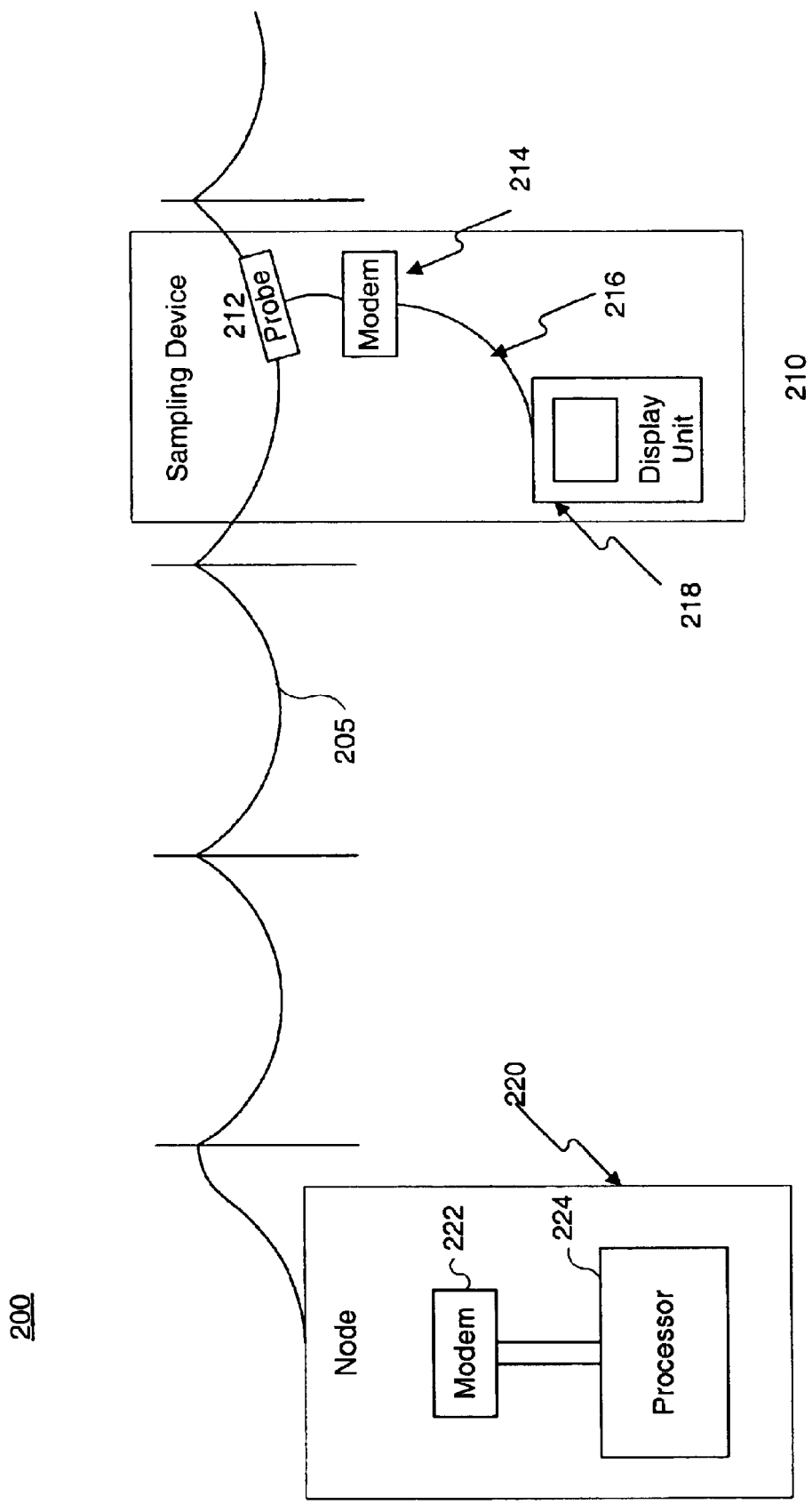
FIG. 2 is a block diagram illustrating exemplary components of one embodiment of the present invention.

Referring next to FIG. 2, an alternative exemplary network system 200 is shown. A sampling device 210 includes a probe 212, a means for sending and receiving data (for example, a modem) 214, and a display unit 218, all interconnected by a link, which is preferably a fiber optic link 216. The sampling device 210 obtains a signal sample from the network 205 at the probe 212. The signal sample is then sent by the modem 214 to a node 220. The node consists of at least a means for receiving and sending data, for example, a modem, 222 and a signal processor 224. A reference signal can also be obtained at the node 220. The signal processor 224 correlates the signal sample from the sampling device 210 and the reference signal and sends the results back to the sampling device 210. The modem 214 in the sampling device 210 receives the results and sends the results to the display unit 218. The modem 214 in the sampling device 210 and the modem 222 in the node 220 may communicate either over the network 205 on an unused pair, over a telephone line (not shown), or over a wireless link (not shown).

Figure 3:
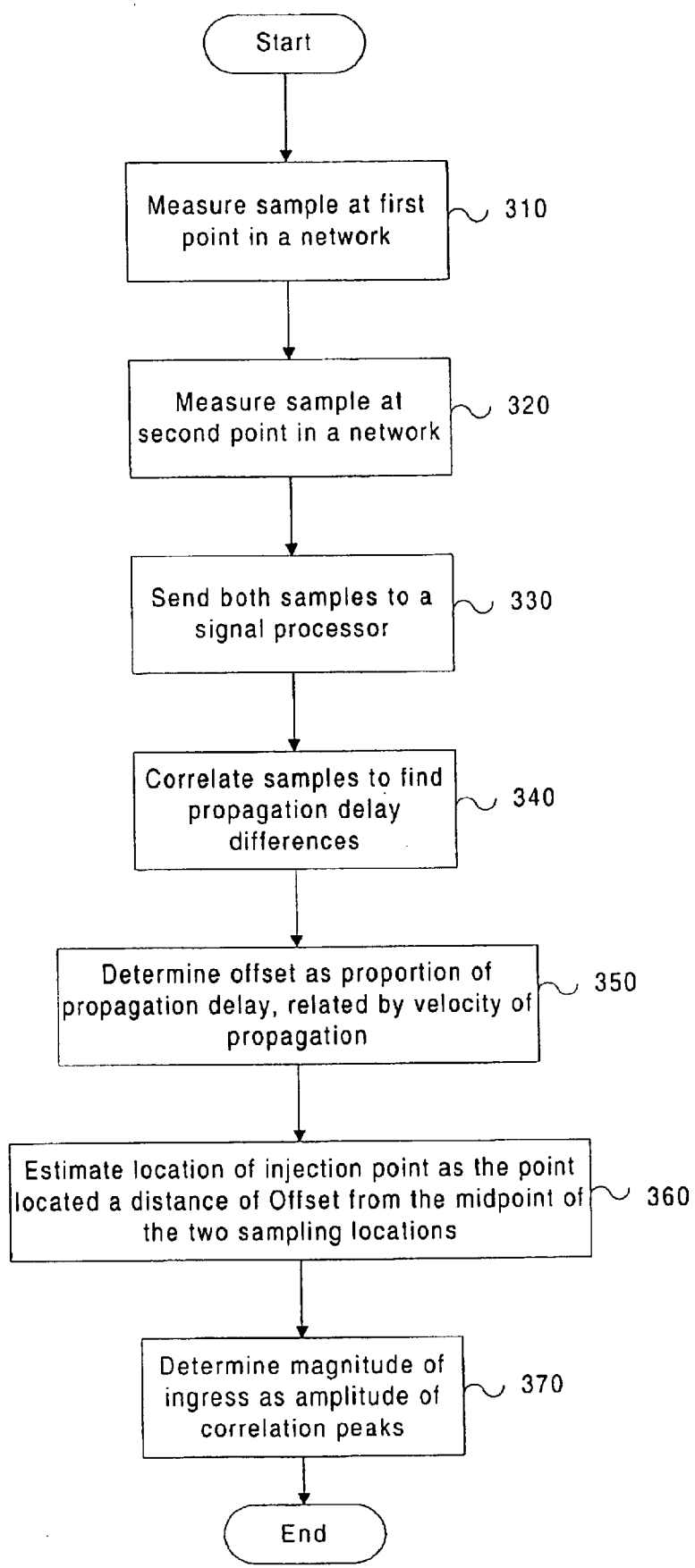
FIG. 3 is a flow diagram illustrating one embodiment of the method of the present invention.

Referring to FIG. 3, a method consistent with an exemplary embodiment of this invention as illustrated in FIG. 1 is shown. First, a sample of the signal is measured by a measuring device at one point in the distribution network 310. Simultaneously, a signal sample is taken by a second measuring device at a second location in a network 320. These samples are then brought to a signal processor 330 which performs a correlation calculation on the samples to determine propagation delay differences 340. The output of the signal processor is the relative correlation between the two signals containing both time and amplitude information. The correlation peaks represent a map of ingress sources where the propagation delay proportionally represents the distance between the injection point and the midpoint of the cable between the two measurement sites, or the offset 350. These parameters are related by the velocity of propagation in the cable. Thus, the injection point is located a distance of offset (a function of the propagation delay, related by the velocity of propagation) from the midpoint between the measurement sites 360. The amplitude of the correlation peaks represent the magnitude of the ingress at that location 370.

In order to improve the sensitivity of the measurement, the output of the signal processor may be time averaged. As a further option, the correlation averaging may be halted when no ingress signal is detected, which also leads to enhanced sensitivity.

The full bandwidth of the signal is not required in order to accurately estimate the location of an injection point of foreign signals into the network, and thus the signal samples may be bandwidth limited. Increased bandwidth can result in improved spatial resolution, however.

Figure 4:
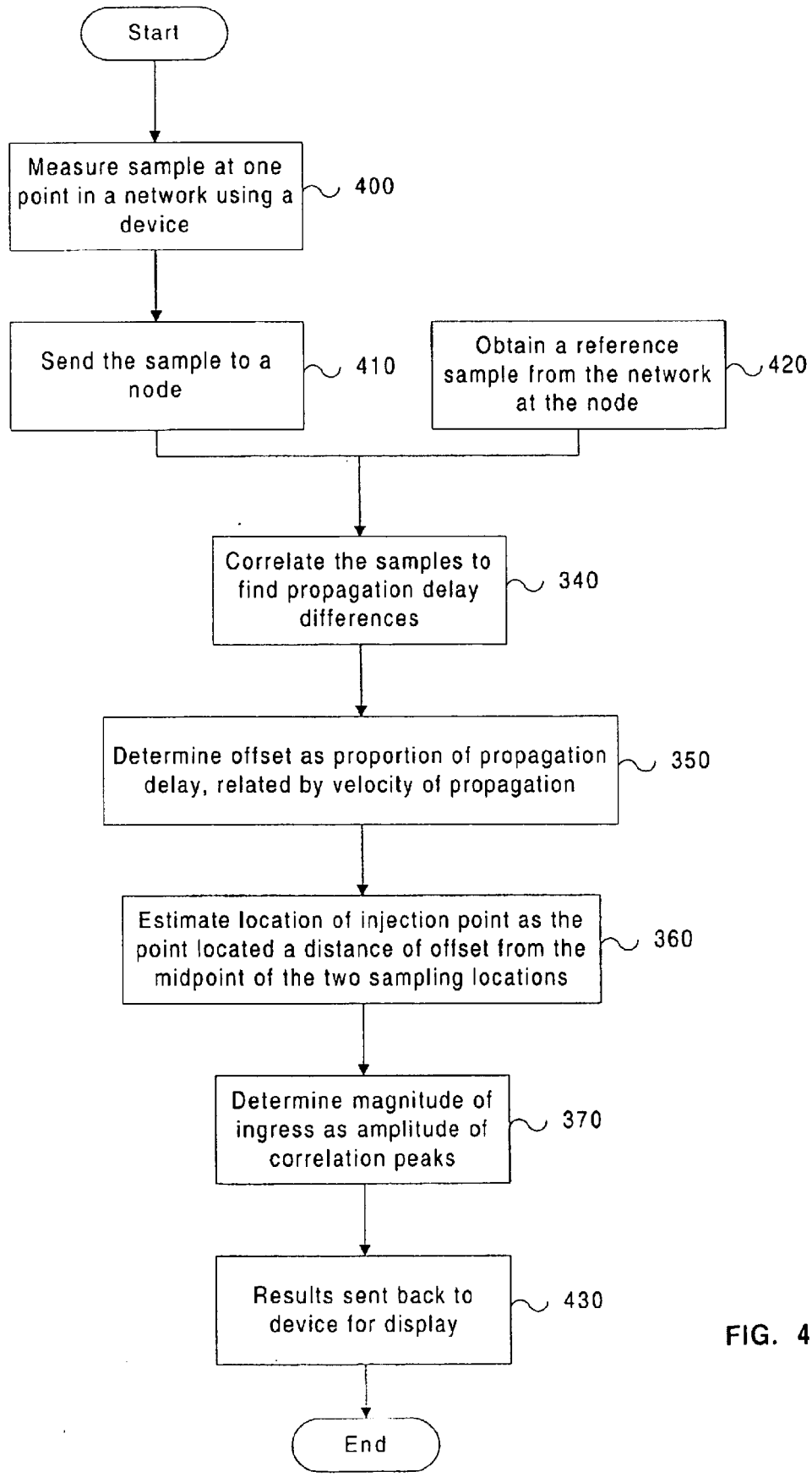
FIG. 4 is a flow diagram illustrating another embodiment of the method of the present invention.

An alternate exemplary method of the present invention is described with reference to FIG. 4, consistent with an exemplary system shown in FIG. 2. A signal sample is measured at one point in a network 400 and is sent to a node 410. The node preferably includes at least a device for sending and receiving data, such as a modem, and a signal processor. At the first location, the signal sample could be measured using a device consisting of a probe and a means to send and receive data, such as a modem. A link connecting the probe and the means to send and receive data would preferably be a fiber-optic link, although other links are suitable. At the node, located at a second location in a network, a reference signal sample is also obtained 420. The reference signal sample and the signal sample sent from the device are correlated to find the propagation delay differences 340. The offset, which is a function of the propagation delay related by the velocity of propagation, is then calculated 350, and the location of the injection point is estimated as a point that is a distance of offset away from the midpoint between the node and the site where the device was used to sample the signal 360. The magnitude of the ingress may also be calculated from the amplitude of the correlation peaks 370. Finally, the processed results are sent from the node back to the device, so that the results can be displayed 430.

It will be understood by those skilled in the art that various changes and modifications may be made, and equivalents may be substituted for elements thereof without departing from the true scope of the invention. In addition, many modifications may be made to adapt a particular element, technique, or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for estimating a location of an injection point of foreign signals in a network, said method comprising the steps of:
    obtaining a first signal sample at a first location in the network;
    obtaining a second signal sample at a second location in the network;
    correlating the two signal samples; and
    establishing the location of the injection point from the correlation result.

2. The method of claim 1, wherein the first location in a network is a node.

3. The method of claim 2, wherein the step of obtaining a second signal sample at a second location in the network further includes sending the second signal sample to the node at the first location in a network.

4. The method of claim 3, wherein correlating the two signal samples occurs at the node at the first location in a network.

5. The method of claim 4, further comprising the step of displaying the correlation result.

6. The method of claim 5, wherein the correlation result is sent from the node at the first location in a network to the second location in the network for display.

7. The method of claim 2, wherein the step of obtaining a first signal sample at the first location in the network includes obtaining a reference sample signal.

8. The method of claim 1, wherein the step of establishing the location of the injection point includes the steps of:
    calculating a propagation delay from the correlation result;
    calculating an offset as being a function of the propagation delay;
    finding a midpoint between the first location in the network and the second location in the network;
    estimating the location of the injection point by locating a point that is a distance equal to the offset from the midpoint.

9. The method of claim 8, wherein the offset and the propagation delay are related by the velocity of propagation.

10. The method of claim 1, further including the step of determining the magnitude of an ingress associated with the injection point.

11. The method of claim 10, wherein determining the magnitude of the ingress includes measuring the amplitude of the correlation result.

12. The method of claim 1, wherein the two signal samples are bandwidth limited.

13. The method of claim 1, wherein the step of correlating the two samples further includes integrating the samples over time.

14. The method of claim 1, further comprising the step of displaying the result of correlation.

15. The method of claim 1, further comprising the step of establishing a location of a potential egress point at the location of the injection point.

16. A system for estimating a location of an injection point of foreign signals in a network, said system comprising:
    means for obtaining a first signal sample at a first location in the network;
    means for obtaining a second signal sample at a second location in the network;
    means for correlating the two signal samples; and
    means for establishing the location of the injection point from the correlation result.

17. The system of claim 16, wherein the means for obtaining the first signal sample includes a probe, a link, and a means for sending and receiving data.

18. The system of claim 17, wherein the link is a fiber-optic link.

19. The system of claim 17, wherein the means for sending and receiving data is a modem.

20. The system of claim 16, wherein the means for correlating signal samples includes a means for sending and receiving data and a signal processor.

21. The system of claim 20, wherein the means for sending and receiving data is a modem.

22. The system of claim 16, further including a means for displaying the correlation result.

23. The system of claim 16, wherein the means for obtaining the second signal sample at a second location in the network includes a means for obtaining a reference signal sample.

24. The system of claim 16, further comprising means for establishing a location of a potential egress point at the location of the injection point.

* * * * *